United States Patent [19]

Matsumura et al.

[11] Patent Number: 5,321,346
[45] Date of Patent: Jun. 14, 1994

[54] NC DATA CREATION METHOD

[75] Inventors: Teruyuki Matsumura; Noritake Nagashima, both of Yamanashi, Japan

[73] Assignee: Fanuc Ltd., Minamitsuru, Japan

[21] Appl. No.: 917,030

[22] PCT Filed: Nov. 26, 1991

[86] PCT No.: PCT/JP91/01622

§ 371 Date: Aug. 17, 1992

§ 102(e) Date: Aug. 17, 1992

[87] PCT Pub. No.: WO92/12469

PCT Pub. Date: Jul. 23, 1992

[30] Foreign Application Priority Data

Dec. 27, 1990 [JP] Japan .................... 2-414575

[51] Int. Cl.⁵ .................... G05B 19/18; G05B 19/403
[52] U.S. Cl. .................... 318/571; 318/572; 318/573; 364/167.01; 364/474.02; 364/474.26
[58] Field of Search ............. 318/560–696; 364/473–475, 191–193, 170

[56] References Cited

U.S. PATENT DOCUMENTS

| 4,445,182 | 4/1984 | Morita et al. ............. 318/572 X |
| 4,571,670 | 2/1986 | Kishi et al. ............. 318/568 |
| 4,580,225 | 4/1986 | Thompson ............. 318/573 X |
| 4,597,040 | 6/1986 | Buizer ............. 318/572 X |
| 4,672,551 | 6/1987 | Ookuma et al. ............. 318/578 X |
| 4,698,573 | 10/1987 | Niwa ............. 318/571 X |
| 4,703,415 | 10/1987 | Kishi et al. ............. 318/572 X |
| 4,739,489 | 4/1988 | Kishi et al. ............. 318/571 X |
| 4,788,481 | 11/1988 | Niwa ............. 318/600 |
| 4,791,342 | 12/1988 | Okamoto ............. 318/569 |

FOREIGN PATENT DOCUMENTS 60-114911 6/1985 Japan .
62-176730 8/1987 Japan .

*Primary Examiner*—Paul Ip
*Attorney, Agent, or Firm*—Staas & Halsey

[57] ABSTRACT

Disclosed is an NC data creation method for creating NC data by designating a cutting amount to be cut by a single cutting operation carried out by a cutting tool, and a target cutting amount of a workpiece when a cutting operation program is created by an interactive mode, to thereby set a final cutting amount to an optimum value. The NC data is created in such a manner that a lower limit value is set with respect to a cutting amount to be cut by a single cutting operation carried out by the cutting tool, a required number of cutting operations and a final cutting amount are calculated based on the cutting amount and a target cutting amount, and the NC data is created by changing the NC data to a value in which each cutting amount is not smaller than the above lower limit value.

3 Claims, 3 Drawing Sheets

NC DATA CREATION METHOD

TECHNICAL FIELD

The present invention relates to an NC data creation method performed by an interactive type numerical control apparatus and the like, and more specifically, to an NC data creation method by which an NC program is automatically created by inputting rough machining data for a lathe and the like through a cutting condition screen.

BACKGROUND ART

Conventionally, when a program for a cutting operation is created by an interactive mode, a cutting tool is sometimes required to carry out a plurality of cutting operations. For example, when a workpiece has a large target cutting amount, a cutting amount to be cut by a single cutting operation is designated in accordance with a type of cutting tool, a raw material of a workpiece, a cutting direction and the like, and the number of a cutting operations is designated by dividing a total cutting amount by the designated cutting amount.

In a conventional rough machining, however, since the number of cutting operations and a final cutting amount to be cut by a cutting tool are determined from a quotient and remainder obtained by dividing a target cutting amount by a designated cutting amount, the final cutting amount has various values ranging from zero to the designated cutting amount. When this final cutting amount has a very small value, it becomes very difficult to actually carry out a machining operation by using a rough cutting tool.

More specifically, since a cutting state and cutting tool life depend on a depth of a workpiece cut by a cutting blade in a cutting operation, a cutting amount must be designated to an optimum value in accordance with a configuration of a cutting tool, a material of a workpiece to be cut, a cutting speed and a feed. Therefore, an interactive type automatic programming unit generally has a standard cutting amount set therein as a parameter, and an operator arbitrarily changes this cutting amount within an effective cutting range, when necessary. Nevertheless, although a cutting amount must be set to an optimum value to increase the efficiency of a program and an actual machining efficiency, it is very difficult for the operator to manually change a final cutting amount to an optimum range.

DISCLOSURE OF THE INVENTION

Taking the above into consideration, an object of the present invention is to provide an NC data creation method by which a final cutting amount can be set to an optimum value.

To attain the above object, according to the present invention, there is provided an NC data creation method for designating a cutting amount (a) to be cut by a single cutting operation carried out by a cutting tool, and a target cutting amount (b) of a workpiece when a cutting operation program is created by an interactive mode, the method comprising the steps of setting a lower limit value for the cutting amount (a) to be cut by a single cutting operation carried out by the cutting tool, calculating the required number (n) of cutting operations, and a final cutting amount (d) from the following formula based on the cutting amount (a) and the target cutting amount (b):

$$n = [b/a], \quad d = b - a \times n$$

and changing NC data to a value in which each cutting amount is not smaller than the lower limit value.

The lower limit value (s) with respect to the cutting amount (a) to be cut by a single cutting operation can be set in an interactive type automatic programming unit and the like, and a cutting amount (a) set as a standard parameter value, including a final cutting amount (d), can be automatically changed to an optimum value within an effective cutting range.

BEST MODE OF CARRYING OUT THE INVENTION

An embodiment of a method according to the present invention will be described below with reference to the drawings.

Figure 2:
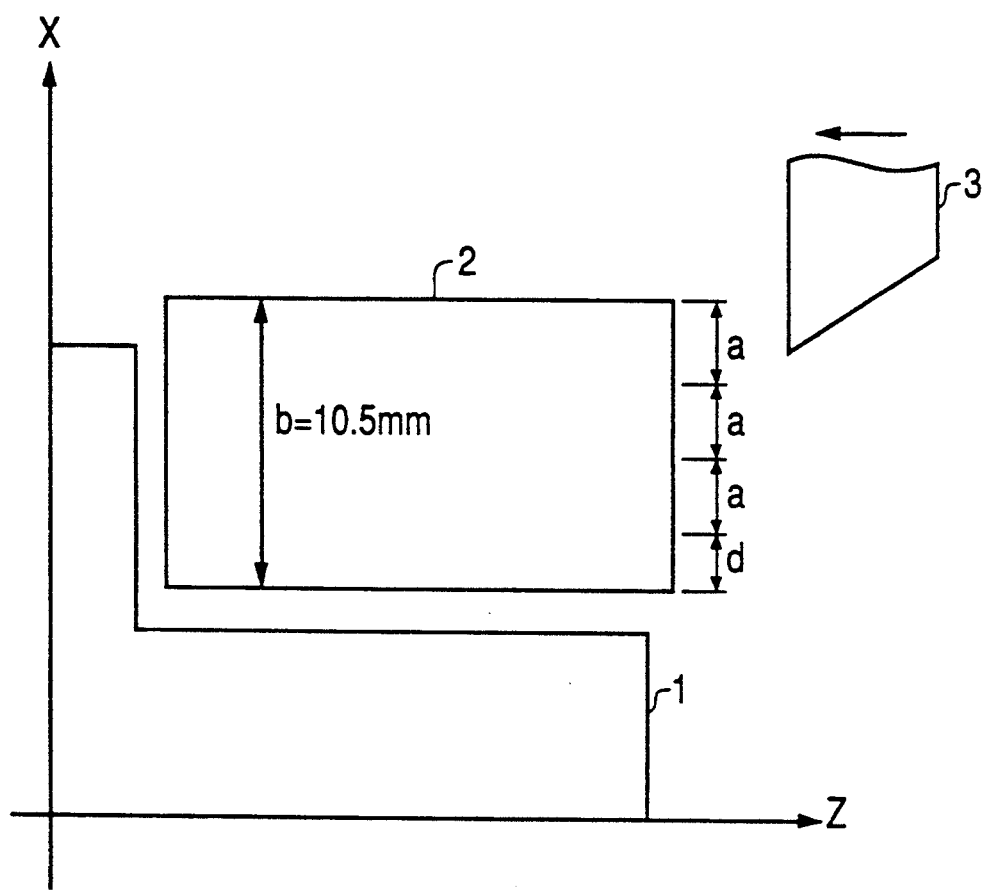
FIG. 2 is a diagram showing a cutting condition screen through which an outside diameter cutting condition is set.

FIG. 2 is a diagram showing a cutting condition screen through which an outside diameter cutting condition is set, wherein a part configuration 1, cutting region 2, and cutting tool configuration 3 are shown on an X-Z plane. A cutting amount (a) to be cut by a single cutting operation of a cutting tool, and a target cutting amount (b) of a workpiece, have been set as parameters or otherwise designated by an operator, and a rough machining operation is carried out in such a manner that a cutting tool repeatedly cuts a workpiece from the left side of the figure by a predetermined cutting amount (a) while the workpiece is rotated about a Z-axis. When a total cutting width is set to 10.5 mm, the number of cutting operations is determined to be 10.5÷a.

When the cutting amount (a) is set to 2.0 mm, the rough machining operation is completed by carrying out the cutting operation six times. At this time, a final cutting amount (d) is determined to be 0.5 mm, i.e., 10.5=2.0×5+0.5.

When a lower limit value (s) of the cutting amount is set to 0.5 mm, no problem arises with regard to the thus created NC data, but when the lower limit value (s) is set to 0.6 mm, an actual machining operation becomes very difficult if this value of 0.5 mm is used as it is. In a conventional data creation method, the operator corrects the cutting amount (a) to be cut by a single cutting operation, and the necessary number of cutting operations (n) and the final cutting amount (d) are recalculated.

According to the present invention, the lower limit value (s) with respect to the cutting amount (a) is preset, and when a final cutting amount (d) is calculated, it is compared with the lower limit value (s). When the calculated final cutting amount (d) is greater than the lower limit value (s), it is stored as a final cutting amount (d) as it is. When the calculated final cutting amount (d) is smaller than the lower limit value (s), it is added to a previous cutting amount and an average value x obtained by dividing the resultant value by 2 is compared with the lower limit value (s). When this value x is greater than the lower limit value (s), this average value is stored, but when this value x is still smaller than the lower limit value (s), a one-more previous value is changed by the same procedure and compared with the lower limit value (s), and this recalculation is repeated until a final cutting amount (d) greater than the lower limit value (s) is obtained, and thus all of the cutting amounts including a final cutting amount (d) are changed to an optimum value within an effective cutting range.

When the value x is smaller than the lower limit value (s) even if a first cutting amount is changed, a cutting amount (a) to be cut by a single cutting operation is determined to have an average value obtained by dividing a target cutting amount (b) by the total number of cutting operations n+1.

Figure 1:
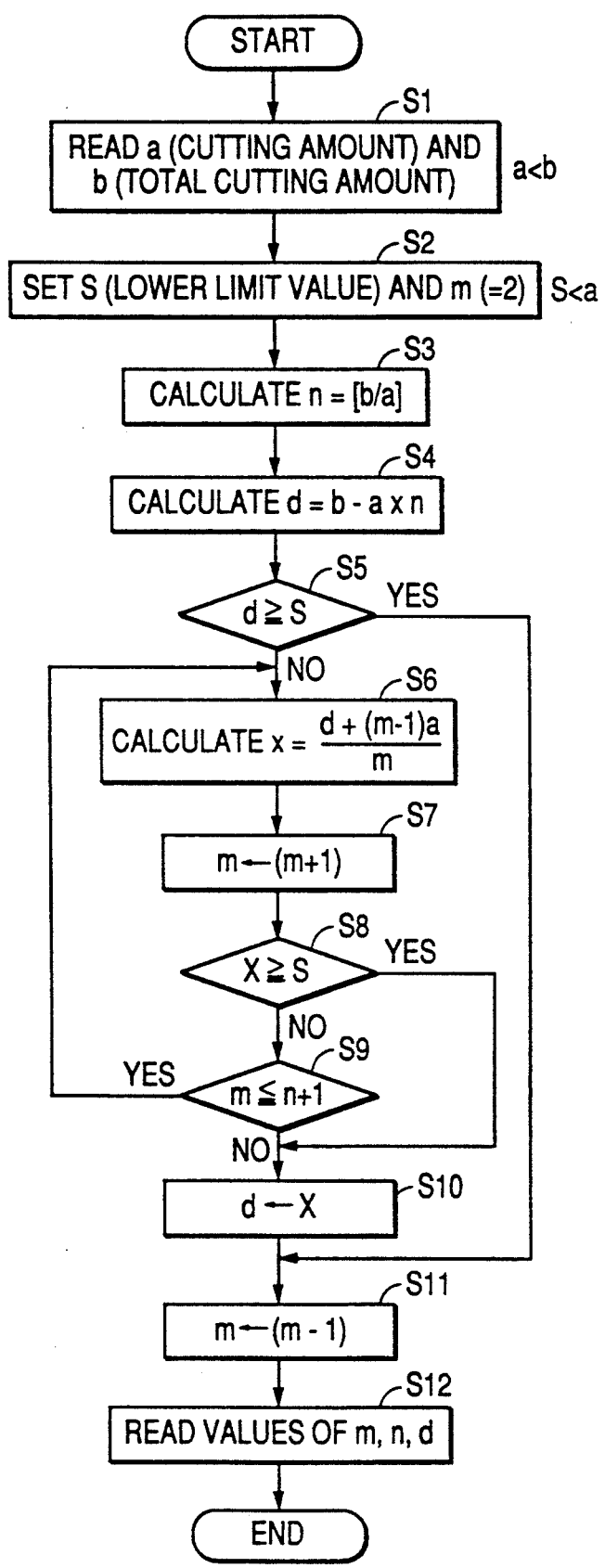
FIG. 1 is a flowchart showing an example of a method according to the present invention.

Next, a procedure for calculating the cutting amount in the NC data creation method according to the present invention will be described. FIG. 1 is a flowchart showing an example of the method according to the present invention, wherein numerals prefixed with an S indicate the numbers of steps.

[S1] A cutting amount (a) to be cut by a single cutting operation and a total cutting amount (b) are read, wherein the total cutting amount (b) is a target cutting amount of a workpiece and (a) and (b) have the relationship a<b.

[S2] A lower limit value (s) for the cutting amount (a) to be cut by a single cutting operation is set, and further, m=2 is set as an initial value of a calculation variable (m) used for a renewal calculation to be described below. This lower limit value (s) is smaller than (a) (s<a) and set together with the cutting amount (a), a clearance, a tool return and escape amount in the case of a drilling operation, a feed speed and a finishing allowance and the like, through a cutting condition screen. A reference value for the lower limit value (s) is automatically set as a parameter and can be arbitrarily changed by the operator.

[S3] The total cutting amount (b) is divided by the cutting amount (a) and the number of cutting operations (n+1) is calculated from a resultant integer value [b/a]=n, wherein n is the number of cutting operations to be carried out by using the cutting amount (a) and is equal to the integer portion of the quotient in the brackets [ ].

[S4] A final cutting amount (d) is calculated from the cutting amount (a), the total cutting amount (b), and the number of cutting operations (n).

[S5] The final cutting amount (d) calculated at step 4 is compared with the lower limit value (s), and when it is not smaller than the lower limit value (s) (d≧s), the flow goes to step 11 [S1]; when it is smaller than the lower limit value (s), the flow goes to step 6 [S6].

[S6] A tentative cutting amount (x) is calculated from the cutting amount (a), final cutting amount (d), and the calculation variable (m), based on the following renewal calculation formula.

$$x = \{d + (m-1)a\}/m$$

[S7] The calculation variable (m) for the renewal calculation is supplemented by 1.

[S8] The tentative cutting amount (x) calculated at step 6 is compared with the lower limit value (s), and when it is not smaller than the lower limit value (s) (x≧s), the flow goes to step 10 [S10]; when it is smaller than the lower limit value (s), the flow goes to step 9 [S9].

[S9] The calculation variable (m) is compared with the number of cutting operations (n+1), and when m<n+1, the flow returns to step 6 [S6] and repeats the renewal calculation from step 6 [S6] to step 9 [S9]; when the calculation variable (m) exceeds the number of cutting operations (n+1), the flow goes to step 10 [S10] because the renewal calculation is impossible.

[S10] The tentative cutting amount (x) calculated at step 6 is set as a cutting amount (d) to be used in place of the final cutting amount (d) obtained at step 4 [S4].

[S11] One is subtracted from the calculation variable (m), for the renewal calculation.

[S12] (n−m+1) is read as the number of cutting operations corresponding to the cutting amount (a) and (d) is read as a cutting amount to be cut (m) times from the (n−m+2)th time to the final time, wherein (m) is the number of cutting operations corresponding to the cutting amount (d).

Next, a specific example of a cutting amount calculated by the NC data creation method according to the present invention will be described when the lower limit value of a cutting amount is set, wherein it is assumed that the cutting amount (a) is set to 2.0 mm and a total width to be cut is set to 10.5 mm.

(1) Where the case the lower limit cutting value (s) is set to 0.3 mm:

The cutting amount (a) from the first to fifth times is 2.0 mm and the cutting amount (d) at the sixth time is 0.5 mm, which is shown as follows;

$$a = 2.0 \times 5 + 0.5 = 10.5$$

In this case, the calculation variable (m) of the renewal calculation in FIG. 1 is 1, and only the final cutting amount (d) is determined at step 4.

(2) Where the lower limit cutting value (s) is set to 0.6 mm:

The cutting amount (a) from the first to fourth times is 2.0 mm and the cutting amount (d) from the fifth to sixth times is 1.25 mm, which is shown as follows;

$$a = 2.0 \times 4 + 1.25 \times 2 = 10.5$$

In this case, the calculation variable (m) for the renewal calculation is maintained as the initial value 2 and the tentative cutting amount (x) calculated at step 6 is used as the cutting amount for the final two times.

(3) Where the lower limit cutting value (s) is set to 1.5 mm:

The cutting amount (a) from the first to third times is 2.0 mm and the cutting amount (d) from the fourth to sixth times is 1.5 mm, which is shown as follows;

$$a = 2.0 \times 3 + 1.5 \times 3 = 10.5$$

In this case, the condition of step 5 shown in FIG. 1 is not established, and the calculation variable (m) is repeatedly executed up to 3, in the loop from steps 6 to 9.

(4) Where the lower limit cutting value (s) is set to a value closer to the cutting amount (a), e.g., 1.8 mm:

All of the cutting amounts from the first to sixth times are 1.75 mm, which is shown as follows;

$$a = 1.75 \times 6 = 10.5$$

In this case, the condition of step 8 shown in FIG. 1 is not established and the flow passes through the loop from steps 6 to 9 [S9], and a result, the set lower limit value is ignored.

Note, even if the calculation procedure shown in FIG. 1 is partially changed and, for example, the renewal calculation is impossible at step 9 [S9], the flow may not go to step 10 [S10] and may return to step 3 [S3] in such a manner that the value of the cutting amount (a) to be cut by a cutting operation is changed to a value smaller by, e.g., (d). With this arrangement, NC data can be created by a change in which all of the cutting amounts are covered by a lower limit value once set.

Figure 3:
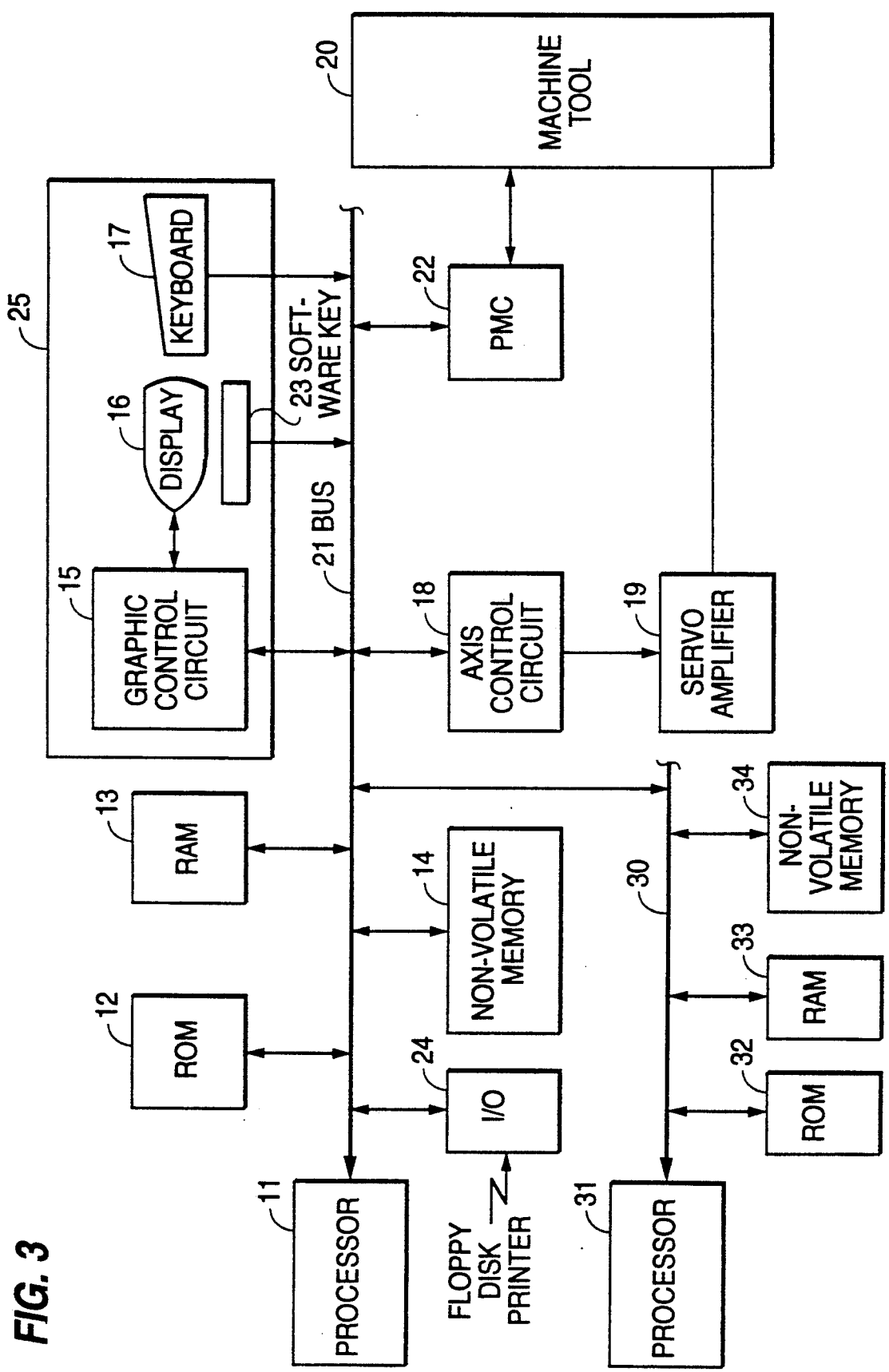
FIG. 3 is a block diagram showing an example of an interactive type numerical control apparatus.

Next, the arrangement of an interactive type numerical control apparatus for realizing the method according to the present invention will be described. FIG. 3 is a block diagram showing an example of the interactive type numerical control apparatus.

A processor 11 controls the numerical control apparatus as a whole, in accordance with a system program stored in a ROM 12. The ROM 12 is an EPROM or EEPROM, and a RAM 13 is a SRAM or the like in which various data or I/O signals are stored. A nonvolatile memory 14 is composed of a CMOS which stores, e.g., a standard value and lower limit value of a cutting amount as parameters to be maintained even after a power supply to the numerical control apparatus is cut off, because the CMOS is supplied with power from a battery.

A graphic control circuit 15 converts digital signals into signals for display, and supplies those signals to a display 16. A CRT or liquid crystal display is used as the display 16, to display a screen for setting a configuration and machining conditions, a created machining program and the like, when the machining program is created by an interactive mode.

A keyboard 17 is composed of symbol keys, numerical keys, and the like, and in addition to the above mentioned lower limit value (s), necessary NC data such as the cutting amount (a), clearance, tool return and escape amount in the case of a drilling operation, feed speed, finishing allowance, and the like are input by using these keys.

An axis control circuit 18 receives an axis movement command from a processor 11 and outputs same to a servo amplifier 19, and upon receiving the axis movement command, the servo amplifier 19 drives the servo motors of a machine tool 20. These components are interconnected through a bus 21.

When an NC program is executed, a programmable machine controller (PMC) 22 receives a T function signal (tool selection signal) and the like through the bus 21, and the PMC 22 then processes this signal through a sequence program and outputs a signal as an operation command, to thereby control the machine tool 20. Further, the PMC 22 receives a state signal from the machine tool 20, sequentially processes same, and transfers a required input signal to the processor 11 through the bus 21.

Note that a software key 23 having a function which is changed by the system program and the like, and a serial interface 24 through which the NC data is transferred to an external device such as a floppy disk, printer, paper tape reader (PTR) and the like, are also connected to the bus 21. This software key 23 is provided with a CRT/MDI panel 25, together with the above display 16 and keyboard 17.

A processor 31 for an interactive operation having a bus 30 is connected to the above bus 21, in addition to the processor 11 as a CPU for a numerical control operation. The processor 31 for the interactive operation calculates the required number (n) of cutting operations and the final cutting amount (d), based on the cutting amount (a) and target cutting amount (b). A ROM 32, RAM 33 and non-volatile memory 34 are connected to the bus 30 of this processor 31.

An input screen of the interactive data displayed at the display 16 is stored in the ROM 32, and when NC data is created, a moving locus of a cutting tool as a whole and the like are displayed at the input screen of the interactive data as a background animation. Further, jobs or data able to be set through the input screen are shown at the display 16 by using menus, and these menus are selected through the software key 23 disposed at the lower portion of the screen. The RAM 33 is a SRAM or the like in which various interactive data is stored.

The input NC data is processed by the processor 31 for an interactive operation according to the calculation shown by the procedure of FIG. 1, to thereby create a workpiece machining program, and the created program data is sequentially displayed at the display 16 to be used by an interactive mode as a background animation. Further, the workpiece machining program stored in the non-volatile memory 34 as an NC sentence is also executed when a machining carried out by the machine tool 20 is simulated and displayed as a foreground animation.

Although the case in which a cutting amount is set from a cutting condition screen through which a rough machining condition is set is described above, the present invention can be also applied to a groove machining and milling operations for pecking, in the same way, to thereby automatically set an optimum cutting amount.

As described above, according to the method of the present invention, a lower limit value of a cutting amount can be set and a final cutting amount can be automatically adjusted based on the lower limit value.

As a result, an NC sentence can be created with a cutting amount set to an optimum amount within an effective cutting range, and in particular, an optimum program can be simply created by using an interactive type programming unit.

We claim:

1. An NC data creation method for designating a cutting amount (a) to be cut by a single cutting operation carried out by a cutting tool and a target cutting amount (b) of a workpiece when a cutting operation program is created by an interactive mode, comprising the steps of:

setting a lower limit value for said cutting amount (a) to be cut by said single cutting operation carried out by said cutting tool;

calculating a required number (n) of said single cutting operations and a final cutting amount (d) from the following formula based on said cutting amount (a) and said target cutting amount (b):

$$n = b/a, \ d = b - a \times n;$$

and changing NC data to a value in which each cutting amount is not smaller than said lower limit value.

2. An NC data creation method according to claim 1, wherein when said final cutting amount (d) is smaller than said lower limit value, respective cutting amounts carried out at m times from the $n-m+2$ th time to the final time (m is a positive integer) are averaged and the values of said m and a cutting amount (x) represented by $x = (d+(m-1)a)/m$ are determined so that said cutting amount (x) is not smaller than said lower limit value.

3. An NC data creation method according to claim 2, wherein when the values of said m and said cutting amount cannot be determined in a range in which said values are not smaller than said lower limit value, said cutting amount to be cut by said single cutting operation is changed to an averaged value $(=b/(n+1))$.

* * * * *